W. A. BARLOW.

Heating Stove.

No. 2,435. Reissued Jan. 1, 1867.

Witnesses:
J. W. Coombs
James Laird

Inventor:
W. A. Barlow
per Munn & Co
attorneys

N. PETERS. Photo-Lithographer, Washington, D. C.

United States Patent Office.

WILLIAM A. BARLOW, OF ELKHORN, WISCONSIN.

*Letters Patent No.* 35,494, *dated June* 3, 1862; *reissue No.* 2,435, *dated January* 1, 1867.

HEATING-STOVE.

The Schedule referred to in these Letters Patent and making part of the same.

TO WHOM IT MAY CONCERN:

Be it known that I, WILLIAM A. BARLOW, of Elkhorn, in the county of Walworth, and State of Wisconsin, have invented a new and useful improvement in Stoves, for which Letters Patent of the United States were granted me on the 3d day of June, 1862; and I do hereby declare that the following is a full and exact description thereof, reference being had to the accompanying drawings, making part of this specification, and the letters marked thereon, similar letters indicating corresponding parts in the several drawings.

Figure 1:
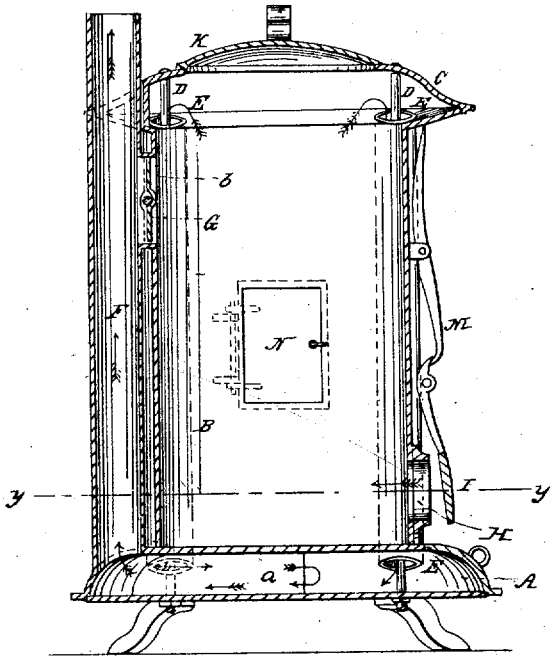
Figure 1 is a vertical section of my stove, taken in the line *x x* of fig. 2.
Figure 2:
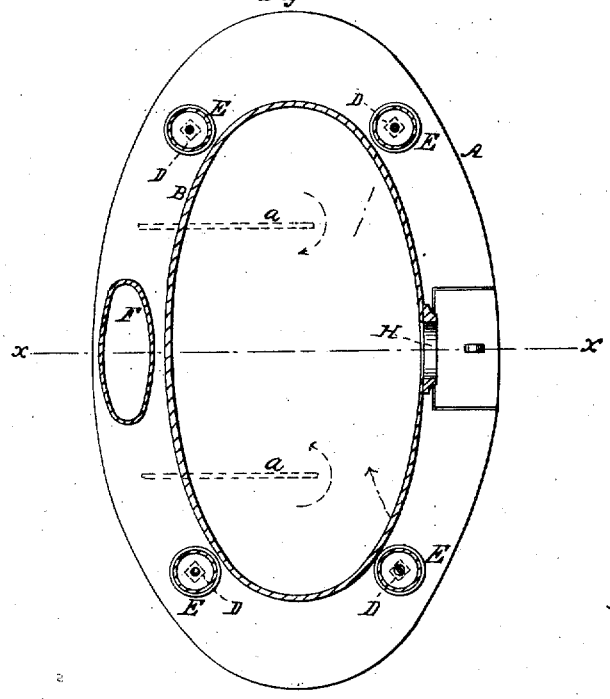
Figure 2 is a horizontal section in line *y y*, fig. 1.

A represents the double or hollow base, which extends out beyond the body B far enough to receive the downward-draught pipes E E outside of and separate from the body B, so as to open communication through them to the hollow of said base, which is provided with two flue-dividing plates *a a*, which are for the purpose of causing the heated products of combustion brought down by the pipes E E to circulate in said base round to the pipe F, by which it may escape to the smoke pipe, and thence to the chimney. This base, thus composed of top and bottom plates only, so formed as to enclose a space between them, below the ash chamber, and hence capable of being occupied solely by the products of combustion in their passage from the descending flues to the ascending flue or flues, not only furnishes a cheap and simple method of construction, but an increased efficacy, in largely adding to the radiating surface of the bottom of the stove. C is the double top, which is projected over the body B, same as the base A, and is constructed substantially in the same manner, of top and bottom plates, and for similar purposes of cheapness of construction and enlarged radiating surface. The top projects far enough to receive the pipes E E outside of and separate from the body B, the upper ends of said pipes communicating with the combustion-chamber, so as to receive the products of combustion and conduct them down into the base, for the purpose not only of heating the pipes on the passage, but of circulating in and heating the base also, which is of great advantage. F is the back pipe, which receives the spent products of combustion from base A, and through which they are passed off to the chimney. G is a damper, by turning which a communication is closed or opened from the combustion-chamber to the pipe F, for the purpose of a direct draught, sometimes necessary when kindling a fire. N is the feed door; H, the draught opening; I, the damper to close the said draught opening. D D are rods, or long bolts, which pass down from the extreme top through the pipes E E and the lower part of base A, by which the whole stove is firmly bolted together. K is the cover to the fire-chamber, which is movable. The relation of the flue-dividing plates *a a* to the pipes E E is important, from the fact that they tend to equalize the traverse of the draught between the front and back pipes, from the point of their communication in the hollow of the base to the ascending draught pipe F; then, of course, the heat is distributed more evenly in every pipe, and consequently equalized in every part of the stove. The descending pipes E E E E and the ascending pipe F are all far enough out from the body of the stove to admit the atmosphere to circulate between them and the body of the stove, both for its heating ability and the durability of all its parts. Besides, setting the pipe F outside from the body of the stove leaves the fire-chamber unobstructed, and the full size of the interior of the stove free from obstruction.

What I claim as my invention, and desire to secure by Letters Patent, is—

The base A, composed of top and bottom plates only, so formed and united as to enclose a hollow or space under the whole body of the stove, and occupied throughout by the products of combustion, in passing from the descending to the ascending flue or flues, substantially as and for the purposes herein specified.

I also claim the combination and arrangement of the projecting base A, composed of top and bottom plates, enclosing a space; the projecting top C, similarly composed of top and bottom plates; and the pipes or flues E E and F, outside of and distinct from the body of the stove, substantially as and for the purposes herein set forth.

In combination with the above, I also claim the dividing plates *a a*, substantially as and for the purpose herein described.

WM. A. BARLOW.

Witnesses:

HARVEY CHURCH,

HENRY S. CHURCH.